No. 862,809. PATENTED AUG. 6, 1907.
G. W. CONKLIN.
TOOL HOLDER.
APPLICATION FILED MAR. 14, 1906.
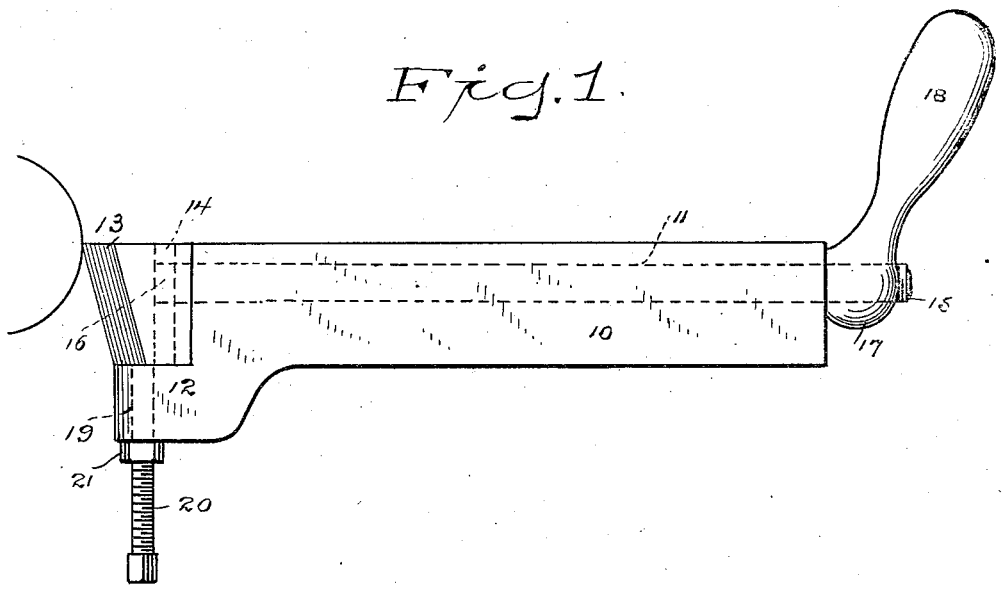
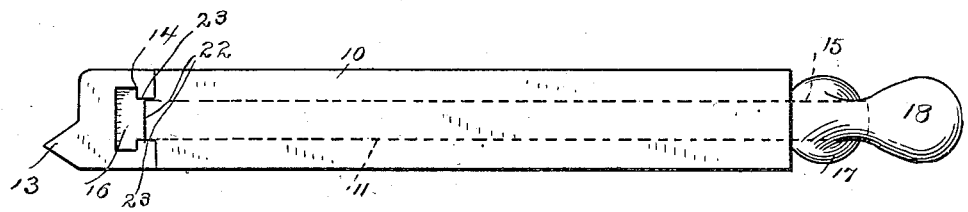
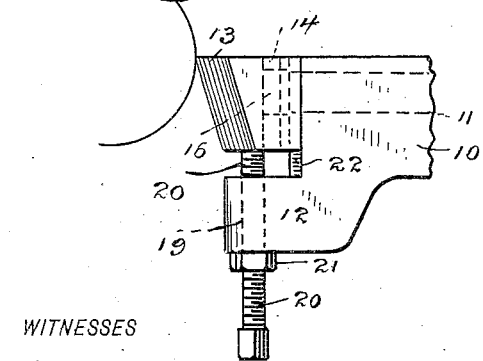
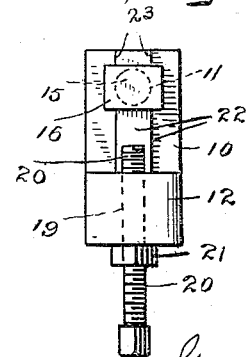
WITNESSES
H. A. Lamb.
S. W. Atherton.
INVENTOR
George W. Conklin
BY
A. M. Wooster
ATTORNEY

UNITED STATES PATENT OFFICE.

GEORGE W. CONKLIN, OF SHELTON, CONNECTICUT.

TOOL-HOLDER.

No. 862,809.  Specification of Letters Patent.  Patented Aug. 6, 1907.

Application filed March 14, 1906. Serial No. 305,982.

To all whom it may concern:

Be it known that I, GEORGE W. CONKLIN, a citizen of the United States, residing at Shelton, county of Fairfield, State of Connecticut, have invented a new and useful Tool-Holder, of which the following is a specification.

This invention has for its object to provide a tool holder adapted for general use upon lathes, planing machines, shaping machines, &c., and especially adapted for use upon automatic threading lathes and elsewhere where it is desirable to raise or lower the tool without moving the tool holder.

With these and other objects in view I have devised the simple and novel tool holder which I will now describe, referring to the accompanying drawing forming a part of this specification and using reference characters to indicate the several parts:

Figure 1 is a side elevation illustrating my novel tool holder with a tool in position as in use; Fig. 2 a plan view corresponding therewith; Fig. 3 a side elevation showing the tool raised after it has been partly ground away; and Fig. 4 is an end elevation of the tool holder with the tool removed.

10 denotes the body of my novel tool holder which is provided with a longitudinal hole 11 and below the hole with an abutment 12.

13 denotes the tool which may be of any ordinary or preferred type, a threading tool being illustrated in the drawing.

An essential feature of the invention is that the holder and the tools for use therewith are provided with interlocking ribs or projections which hold the tool rigidly against torsional strain in use. In the present instance I have shown a tool provided with a vertical angular recess 14 at the rear end of which are inwardly projecting ribs 23, and have shown the body as provided with a vertical rib or projection 22 which extends from the abutment up to the top of the body and the sides of which are closely engaged by the faces of the ribs or projections on the tool that is being held.

15 denotes an attaching bolt which is provided with an angular head 16 corresponding in shape with and adapted to engage the angular recesses in the tools. The shank of the attaching bolt extends through and beyond the body and is threaded at its outer end to receive a nut 17 which for convenience in operation is provided with a handle 18. The abutment is solid excepting for the vertical threaded hole 19 in which is an adjusting bolt 20 for the tool, which rests in use either upon the abutment as in Fig. 1 or upon the end of the bolt as in Fig. 3. This construction not only affords a strong support for the tool, but also avoids any liability of the bolt 20 being loosened or its adjustment shifted when the tool is released for removal or any other purpose.

Should it be desired to raise the tool at any time and for any purpose without moving the tool holder, nut 17 is loosened slightly and the tool is raised by turning adjusting bolt 20 inward. After the tool has been adjusted the attaching bolt is locked in place to support the tool firmly by means of a lock nut 21.

An important feature of my present invention is that it effects a great saving in the cost of tools which wear away from grinding. The present invention enables me to use a tool until a large portion of the tool, from two-thirds to three-fourths, is ground away.

The construction of the tool holder is such that it is practically non-breakable, as the strain of use is taken up where there is ample metal to resist it, the tool holder as a whole being relatively light but very strong. In use the tool rests either upon the abutment or upon the end of the adjusting bolt which is locked in the abutment. As already stated, the faces of ribs 23 on a tool bear firmly against the sides of rib 22 on the body. When nut 17 is tightened up and the attaching bolt and its angular head are drawn backward, the rear face of the tool is clamped tightly against the forward end of the holder, so that the tool is rigidly held against any movement whatever, the interlocking ribs upon the tool and holder rendering it impossible to twist the tool sidewise under any strain that can be placed upon it in use. To adjust the tool at any time, it is simply required to loosen the lock nut and nut 17 and to turn the adjusting bolt slightly. While nut 17 is loosened the tool may be removed and a new one put in its place and allowed to rest either upon the adjusting tool or upon the abutment. Having placed a tool in position, a slight turn of nut 17 draws the head of the attaching bolt backward and clamps the tool firmly against the end of the holder, the tool being firmly locked against any vertical, lateral or torsional movement.

Having thus described my invention I claim:

1. The combination with a body having a longitudinal hole and at its forward end a solid abutment provided with a threaded hole and a tool, said tool being provided in its rear face with an attaching recess extending longitudinally thereof transverse of the hole and said body and said tool being provided with interlocking ribs, of an attaching bolt in the longitudinal hole having an angular head adapted to engage the recess in the tool, a nut on said bolt for locking the tool in place and an adjusting bolt in the abutment for supporting the tool at any desired vertical adjustment.

2. The combination with a body having a longitudinal hole and at its forward end an abutment, and a rib extending upward from the abutment and a tool having a vertical recess and at its rear end ribs whose faces engage the sides of the rib on the body, of an attaching bolt having an angular head adapted to engage the recess in the tool and a nut on said bolt for locking the tool in place.

In testimony whereof I affix my signature, in presence of two witnesses.

GEORGE W. CONKLIN.

Witnesses:
CHARLES FRENCH,
PEARL H. ROBINSON.